United States Patent [19]

Bilsing

[11] Patent Number: 4,613,278
[45] Date of Patent: Sep. 23, 1986

[54] CONVEYOR ROBOT

[76] Inventor: Alfred Bilsing, Schwedengraben 12, 5952 Attendorn, Fed. Rep. of Germany

[21] Appl. No.: 527,761

[22] Filed: Aug. 30, 1983

[30] Foreign Application Priority Data

Sep. 9, 1982 [DE] Fed. Rep. of Germany ... 8225377[U]

[51] Int. Cl.⁴ .............................................. B66C 23/00
[52] U.S. Cl. ............................... 414/736; 414/744 A; 901/18
[58] Field of Search ............... 901/14, 18; 414/744 A, 414/744 B, 744 C, 728, 718, 736

[56] References Cited

U.S. PATENT DOCUMENTS

| | | | |
|---|---|---|---|
| 1,895,824 | 1/1933 | Stenhouse | 414/744 A |
| 2,792,953 | 5/1957 | King | 901/14 X |
| 3,630,391 | 12/1971 | Wilson | 414/744 A |
| 3,834,555 | 9/1974 | Bennington et al. | 414/744 B X |
| 3,968,885 | 7/1976 | Hassan et al. | 901/14 X |
| 4,492,511 | 1/1985 | Bilsing . | |

FOREIGN PATENT DOCUMENTS 2630858 12/1978 Fed. Rep. of Germany .
729028 4/1980 U.S.S.R. ........................... 901/18 X Primary Examiner—Joseph E. Valenza
Assistant Examiner—Dennis Williamson
Attorney, Agent, or Firm—Larson & Taylor

[57] ABSTRACT

The conveyor robot which, in particular, is intended for being mounted between presses, comprises a double arm (14) that is rotatable about a central, vertical axis (12) and swingable about a central, horizontal axis (16). Both ends of the double arm (14) support engaging members (26) which, independently of one another, are extendable to opposite sides. The double arm (14) is formed with an articulated joint the axis of which coincides with the central, horizontal axis (16). The two parts (36,38) of the double arm (14) separated by the articulated joint are interconnected by a cross-bar (28) variably adjustable in length.

5 Claims, 1 Drawing Figure

U.S. Patent  Sep. 23, 1986  4,613,278
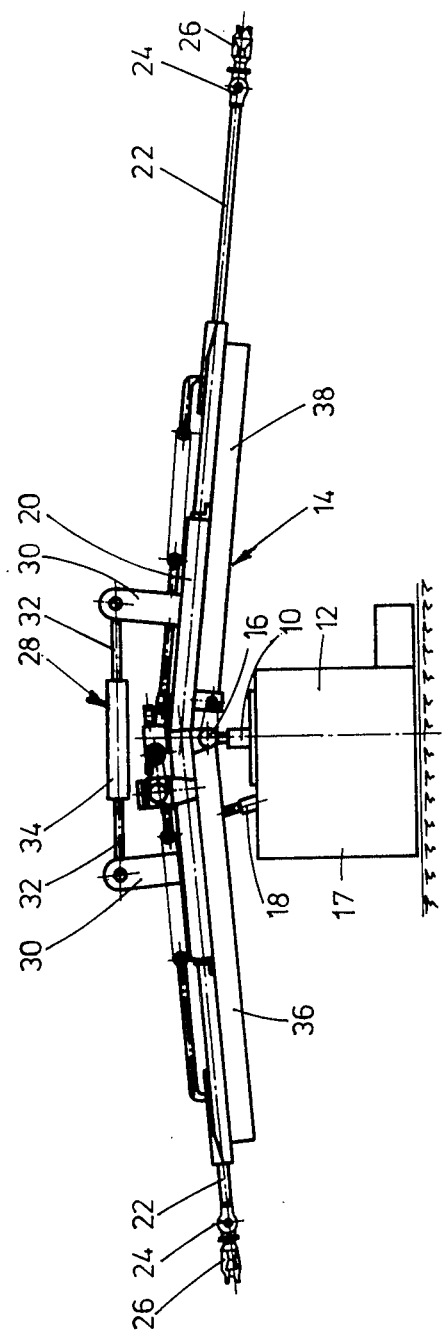

CONVEYOR ROBOT

The invention relates to a conveyor robot, especially for a press interlinkage, having a double arm rotatable about a central vertical axis and swingable about a central horizontal axis, the interconnected arms of the double arm support individually movable engaging members extendable in opposite directions independently of one another.

A number of different conveyor robots having two arms are known in the art. The arms, in the majority of cases, are disposed in staggered relationship or are individually located on a central support member. Thus in the case where long extensions of the arm and heavy loads are encountered, which is typical for conveyor robots for press interlinkage, substantial forces will have to be taken up by the central support member. These substantial forces, in turn, will require a sturdy construction, especially in the area receiving and guiding the individual arms on the central support member. Moreover, on account of the high inertia, this high inertia will require relatively slow movements and lengthy work cycles.

To avoid the afore-described disadvantages, DE-OS No. 26 30 858 and U.S. Pat. No. 4,492,511 have taught the use of so-called double arm conveyor robots. These double arm conveyor robots have, in place of two individual arms extending to opposite sides, a single continuous arm (double arm) which absorbs the forces occurring as a result of its own weight and the transported load. These forces are absorbed in the form of tensile and compressive stresses, substantially acting only as a vertical load on the base part supporting the same.

If the engaging members at the respective two arm ends of the double arm are extensible independently of one another in the longitudinal direction of the arm and are movable relative to the double arm, this will envolve substantial advantages for the working speed of the system. Conversely, over conveyor robots having individually disposed and guided arms, these double arm systems have the disadvantage that the level of the engaging members at the respective ends of the double arm was mutually dependent. If by swinging the double arm about the central horizontal axis the one engaging member at one end was lowered, in the double-arm type of construction, an upward movement of the other engaging member at the other end was necessarily connected therewith. This mutual dependence of the working level of the engaging members will become a problem if the press tables of the two presses between which the conveyor robot is mounted are of different height. Apart from the limited possibility of compensation through the guide and the motion drive of the engaging members on the ends of the arms, in such cases it was only possible first to operate the one engaging member at the one level, then to swing the double arm until the other engaging member had reached the proper level, and finally to have the latter perform the contemplated work.

Basic to the invention is the problem of removing the aforementioned disadvantage inherent with the double arm system while maintaining the advantages of the double arm type of construction. To solve that problem, it is suggested to provide the double arm with an articulated joint.

The suggested articulated joint will now permit individual adjustment of a suitable angle between the two parts of the double arm separated by the articulated joint. In practice, starting e.g. from the extended position of the two arm ends, by swinging the entire double arm, a first one of the engaging members is brought into alignment with the level of the one pressure table. In that position, normally, the other engaging member is not yet at the level proper for the other press table. To adjust it in a manner that both engaging members can simultaneously work on both press tables, the double arm at the suggested articulated joint is so folded and adjusted that the second engaging member will also get into the proper working position. The angular position between the two parts of the double arm can then be maintained constant and need not be changed as long as the respective working level of the engaging members on the two press tables does not change. Thus, the conveyor robot rotates the double arm by 180°, displacing the one of the engaging members from the level of the one of the press tables to the working level of the other of the press tables. However, because the entire double arm is swung about its central horizontal axis, the second engaging member is simultaneously displaced into the working position previously occupied by the first engaging member.

In a preferred embodiment of the invention, the two parts of the double arm separated by the articulated joint are connected by a bridging cross-bar variably adjustable in length. The adjustment of the mutual angular position of the two double arm parts separated by the articulated joint is thus performed by simply changing the length of the cross-bar. As the latter is an integral part of the double arm which is able to transfer tensile stresses from the one arm to the other arm, the advantages of the double arm type of construction are maintained simultaneously with attaining an improved adaptability to variable working levels with no complicating of the control. As changes in the angular position of the two parts of the double arm on the articulated joint are only rarely required, it is usually sufficient for the length of the cross-bar to be adjusted or modified by hand. Accordingly, a structurally simple solution is, a cross-bar which includes a screw jack for changing the length thereof. However, depending on the conditions of use, motor drives for modifying the length of the cross-bar or otherwise modifying the relative angular position of the two parts of the double arm may be provided on the articulated joint.

A particularly advantageous embodiment of the conveyor robot according to the invention will be attained if the articulated joint axis coincides with the central horizontal axis about which the double arm is adapted to be swung (oscillated). In such a case, the two joints can be combined.

The invention will now be explained in greater detail with reference to the drawing showing a front view of the present invention.

In the drawing, the conveyor robot includes a supporting column or upright 10 that is rotatable about a vertical axis 12. Pivotally disposed on upright 10 about a horizontal swing axis 16 is a double arm designated generally by 14. While a controlled hydraulic drive disposed about the vertical axis 12 for rotating the upright 10 mounted in a stationary housing 17 is not shown in the drawing, a similar controlled hydraulic drive for tilting (oscillating) double arm 14 about the horizontal swing axis 16 is illustrated in the form of a power cylinder 18.

Double arm 14 consists of a central portion 20 including guide elements for supporting tubes 22. Tubes 22, relative to the axis of rotation 12, are extendable to opposite sides. The supporting tubes 22 form the extension parts of the double arm. At the free ends thereof, tubes 22 are respectively provided with a drive unit 24. Each drive unit 24 has an engaging member 26 flanged thereto. Each engaging number 26 is rotatable about a longitudinal axis extending longitudinally of the arm and is tiltable about a transverse axis.

Concerning the specific construction of the drives of the supporting tubes 22 and the engaging members 26, reference is made to the afore-mentioned U.S. Patent. In particular, it should be noted that the there described drive of the supporting tubes 22 is a double-acting hydraulic power cylinder secured with the housing thereof to central portion 20. This drive includes a piston rod protruding to both sides from the cylinder housing. At the end of this piston rod, sprocket wheels guided via a chain are rotatably disposed. One strand of the said chain is fixed at a point relative to the central portion 20 of the said double arm whereas a rod is connected to one of the chain links of the other strand which rod is pivoted to the housing of the drive of the engaging member. In the embodiment of the present invention as shown, on each side of the double arm 14, a corresponding drive having a wire rope guided via rollers (rather than a chain guided via sprocket wheels) is used.

The special feature of the conveyor robot as illustrated in the drawing resides in the central portion 20 of the double arm 14 which is provided with an articulated joint. The axis of this joint coincides with the central axis of the rocker joint 16. This means, in other words, that each of the two arms of the double arm by itself is rotatably disposed on the central axis of joint 16. The support of the two arms of the double arm, which tend under the effect of their own weight and the load carried by the engaging members to tilt downwardly, is performed by a cross-bar 28. Cross-bar 28, with the ends thereof, is pivotably disposed on flaps 30 fixedly connected to the two arms of the double arm. Cross-bar 28 in the case shown by way of example, consists of a screw 32 respectively pivotally connected to a flap 30. The screws engage a nut 34 through the rotation of which, e.g. by means of a suitable tool, the screws 32 at the same time are screwable more or less deeply into and out of the nut. This allows the length of the cross-bar 28 to be decreased or increased, thus permitting the angle between the two arms 36 and 38 of the double arm on joint 16 to be modified.

What is claimed is:

1. A conveyor robot, especially for press interlinkage, comprising:
   a stationary base;
   a continuous arm member extending on oppoiste sides of said base;
   rotation means for mounting said continuous arm member to said base for rotation about a single vertical axis;
   swing means for mounting said continuous arm member to said base for oscillation about a single horizontal axis;
   said continuous arm member including (a) a pair of elongate arms extending in opposite, generally horizontal directions, (b) a respective engaging member attached to a respective said elongate arm, each said engaging member being extendable from a respective said elongate arm independently of the other said engaging member, and (c) an articulation joint which joins said elongate arms to each other and which allows one said elongate arm to pivot independently about a single horizontal axis relative the other said elongate arm;
   whereby by appropriate adjustment of said elongate arms about said articulation joint and of said swing means, said elongate arms at different heights are rotatable 180° by said rotation means to the height of the other arm and back again to the original positions.

2. A conveyor robot according to claim 1, wherein said continuous arm member further includes a bridging cross-bar, a variable length means for varying the length of said cross-bar and connecting means for connecting opposite ends of said cross-bar to said elongate arms.

3. A conveyor robot according to claim 2 wherein said cross-bar passes vertically above said articulation joint and the ends of said cross-bar are connected to respective said elongate arms at an intermediate position said elongate arms.

4. A conveyor robot according to claim 2 wherein said variable length means includes a screw and a screw receiving member.

5. A conveyor robot according to claim 1 wherein the single horizontal axis of said swing means is the same as the single horizontal axis of said articulation joint.

* * * * *